Sept. 27, 1927.
E. P. McCLURE
COFFEEPOT
Filed Sept. 15, 1926
1,643,309
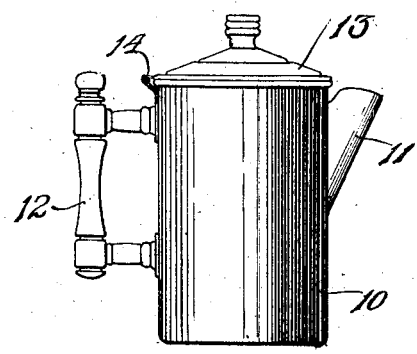
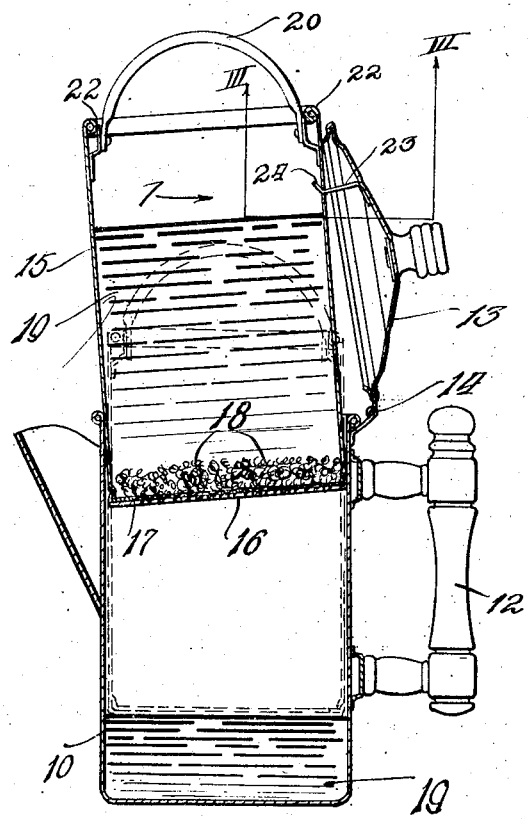
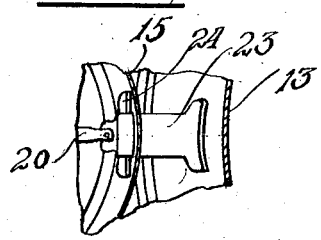
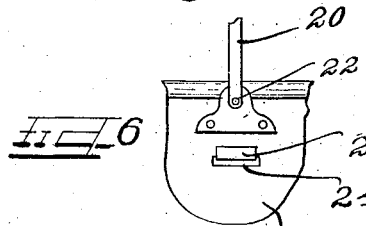
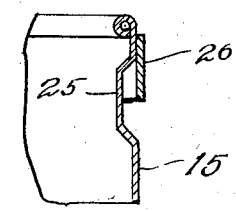
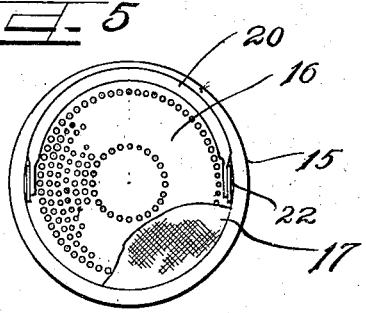
INVENTOR
Elmer P. McClure Patented Sept. 27, 1927.

1,643,309

UNITED STATES PATENT OFFICE.

ELMER P. McCLURE, OF LA GRANGE, ILLINOIS, ASSIGNOR TO ALUMINUM PRODUCTS COMPANY, OF LA GRANGE, ILLINOIS, A CORPORATION OF ILLINOIS.

COFFEEPOT.

Application filed September 15, 1926. Serial No. 135,501.

The invention relates to coffee pots.

One of the objects of the invention is to extend the usefulness of coffee pots.

Another object is to provide a coffee pot by which a beverage of improved quality may be made.

A further object is to provide a coffee pot in which "boiled" coffee, "drip" coffee, or "steeped" coffee may be made with equal facility.

Other objects, advantages, benefits and refinements of the invention will become apparent to persons skilled in the art from a consideration of the following description and accompanying drawings forming a part hereof, wherein:

Figure 1 is a central vertical section of the coffee pot as it appears when in use.

Fig. 2 is a side elevation of the coffee pot.

Fig. 3 is a fragmentary section taken on line III—III of Fig. 1.

Fig. 4 is a modification of Fig. 3.

Fig. 5 is a top plan view of the inner vessel of the coffee pot.

Fig. 6 is a fragmentary part of the inside vessel looking in direction of arrow 7 of Fig. 1.

In all of the views, the same reference characters are used to indicate like parts.

The art of making an acceptable beverage of coffee which shall be the highest standard of excellence is not generally understood.

The coffee bean contains essential oils that contribute to the desirable and healthful quality of the coffee and other ingredients, such as caffeine, tannin, and the like, that are more or less deleterious to health. The objectionable extracts from the coffee bean are readily removed and become part of the infusion when the "grounds" are submerged in the liquid and subjected to a prolonged process of boiling. When the water alone is primarily boiled and poured over the grounds, as in "drip" coffee, or when the grounds are subjected to the action of the hot water below the boiling point and are allowed to be soaked or steeped therein, only the desirable qualities of the bean are absorbed by the liquid and a most excellent quality of coffee is obtained.

In the coffee pot, here of interest, excellent dripped coffee and steeped coffee may be quickly and readily made, and boiled coffee may also be as conveniently made, should any one want it.

The larger outer vessel 10 is provided with a spout 11, handle 12, and top or cover 13, hinged to the vessel 10 at 14. This structure is not materially different from coffee pots generally in use.

There is an inner vessel 15 that fits neatly but freely movable in the larger vessel 10. The vessel 15 has a finely perforated bottom 16 and it may have a cloth lining 17 overlying the perforated bottom 16 to serve as a finer mesh strainer.

The coffee grounds 18 are placed in the vessel 15 on the cloth strainer 17 when the coffee bean has been substantially pulverized to a fine dust, which is recommended. The water 19 is primarily boiled and the pot 10 is set aside where the water is to be kept warm but at a temperature below the boiling point.

The vessel 15 is now inserted wholly within the pot 10 and kept there until it fills with hot water which enters through the filters in its bottom wall.

The vessel 15 is now raised to position shown in Fig. 1 by the bail 20 which is loosely hinged to the sides of 15 at 22. The vessel 15 is held in elevated position shown, until all of the water 19 therein drips out through the pulverized coffee bean into the vessel 10, after which the operation of lowering and raising the inner vessel 15 is repeated.

The vessel is held in its elevated position, as shown, by a tongue 23 which is secured to the cover 13. The tongue 23 enters a slot 24 in the wall of the vessel 15 and by its engagement with a ledge formed thereby supports said vessel in elevated position.

Instead of perforating the vessel 15 for the tongue 23, the wall of the vessel may be indented, as at 25, in Fig. 4, and a ring or clip 26 may be secured to the vessel over the indentation, as shown in Fig. 4, to form the ledge. The indentation 25 may extend entirely around the vessel 15 in shape of an annular groove, and the part 26 may be a ring so that the tongue 23 may enter the groove at any place of the circumference.

To make steeped coffee, the vessel 15 with the pulverized coffee beans may remain in the vessel 10 while the liquid is maintained heated below the boiling point.

To make boiled coffee, the act is the same except that the liquid is kept at the boiling point.

Having described my invention, what I claim as new and desire to secure by Letters Patent is:

A coffee pot comprising an outer vessel having a hinged cover, and an inner vessel freely movable in said outer vessel and of substantially the same length, the inner vessel having a perforated strainer bottom; a tongue extending from the cover toward the inner vessel and a ledge near the top of the inner vessel engaged by said tongue to hold said inner vessel in elevated position.

In testimony whereof I have hereunto subscribed my name.

ELMER P. McCLURE.